(12) United States Patent
Hahn et al.

(10) Patent No.: US 8,359,981 B2
(45) Date of Patent: Jan. 29, 2013

(54) MAGLEV VEHICLE HAVING GUIDANCE MAGNETS

(75) Inventors: Wolfgang Hahn, Kassel (DE); Harald Pfannkuch, Wabern (DE)

(73) Assignee: ThyssenKrupp Transrapid GmbH, Kassel (DE)

(*) Notice: Subject to any disclaimer, the term of this patent is extended or adjusted under 35 U.S.C. 154(b) by 490 days.

(21) Appl. No.: 12/439,879

(22) PCT Filed: Aug. 7, 2007

(86) PCT No.: PCT/DE2007/001422
§ 371 (c)(1),
(2), (4) Date: Aug. 3, 2009

(87) PCT Pub. No.: WO2008/028450
PCT Pub. Date: Mar. 13, 2008

(65) Prior Publication Data
US 2010/0031847 A1    Feb. 11, 2010

(30) Foreign Application Priority Data

Sep. 5, 2006  (DE) .................. 10 2006 042 138

(51) Int. Cl.
*B60L 13/04* (2006.01)

(52) U.S. Cl. .................. 104/286; 104/281; 104/282
(58) Field of Classification Search ............ 104/281, 104/284, 283, 286, 288, 289, 293, 282, 290, 104/292, 294
See application file for complete search history.

(56) References Cited

U.S. PATENT DOCUMENTS
2008/0257197 A1* 10/2008 Hahn et al. ............ 104/282

FOREIGN PATENT DOCUMENTS
| DE | 41 39 471 A1 | 6/1992 |
| DE | 102004056438 | 10/2005 |
| JP | 55-44726 | 3/1980 |
| WO | WO 2005/090117 | 9/2005 |

* cited by examiner

*Primary Examiner* — Mark Le
(74) *Attorney, Agent, or Firm* — McGlew and Tuttle, P.C.

(57) ABSTRACT

A maglev vehicle is provided including a nose and/or tail section (1, 1*b*) containing a plurality of guidance magnets (FM1 to FM6) which are formed of cores (15) and windings (24) wound onto said cores and connected to control circuits (17). The guidance magnets (e.g. FM1 to FM3) are provided with an at least partially higher number of windings (24) in a front zone of the nose section (1) in relation to the direction of travel (v) or in the rear zone of the tail section (1*b*) in relation to the direction of travel (v).

20 Claims, 6 Drawing Sheets

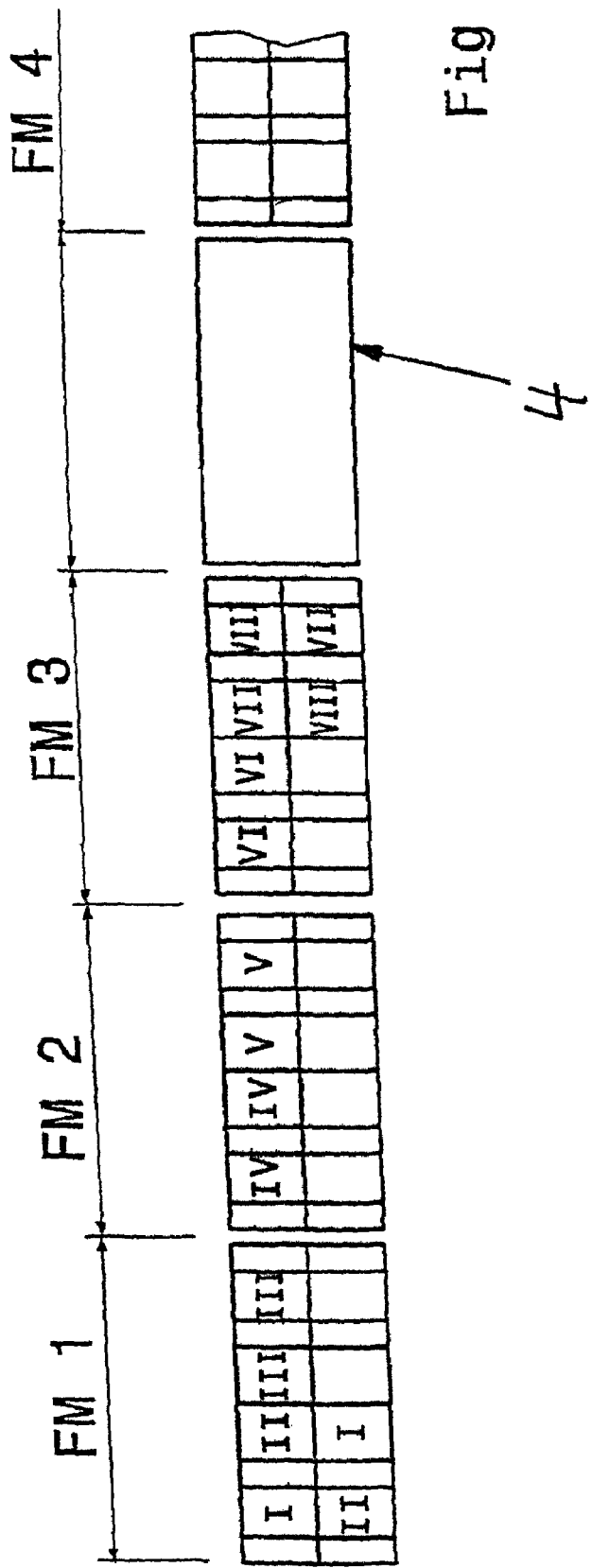

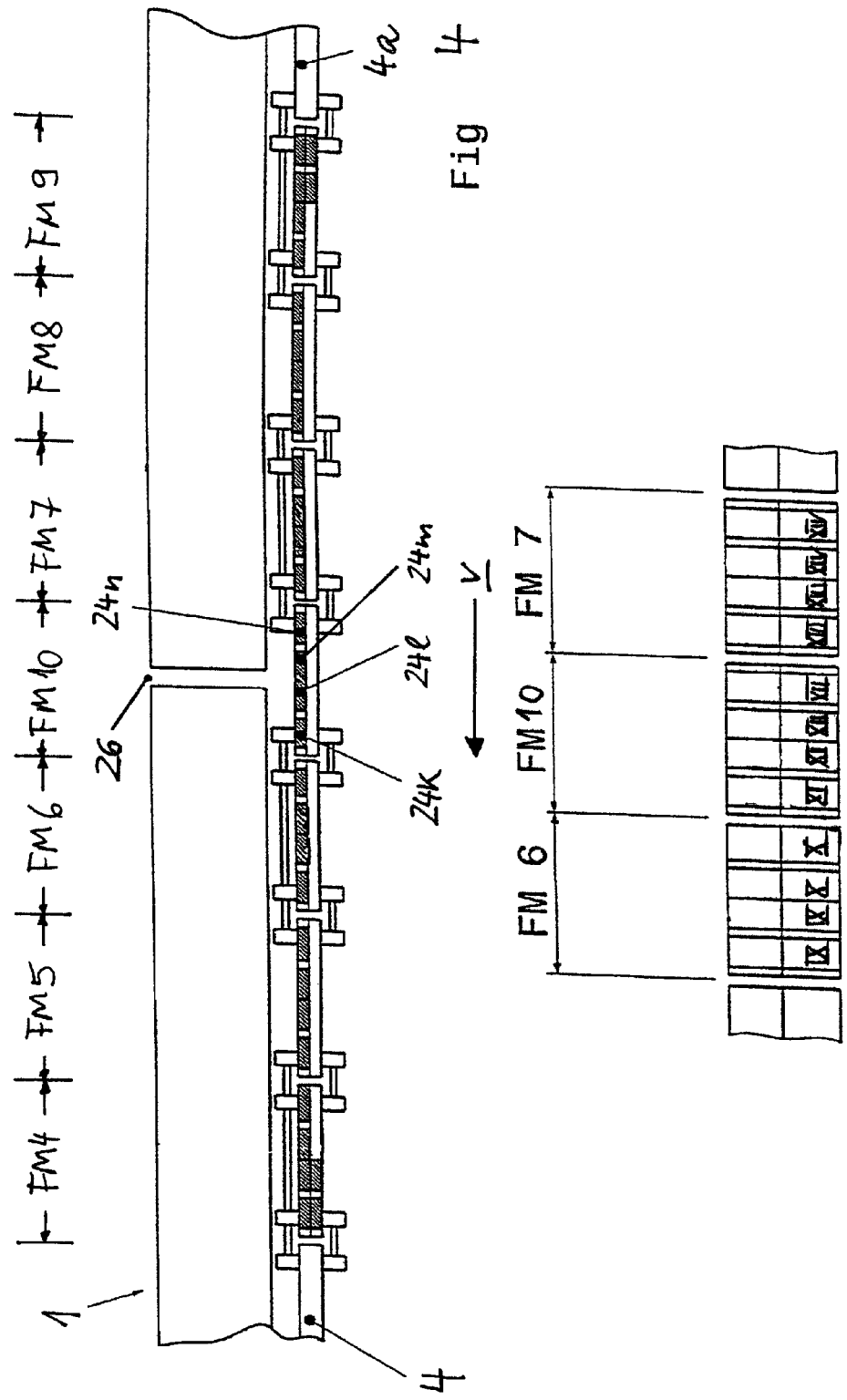

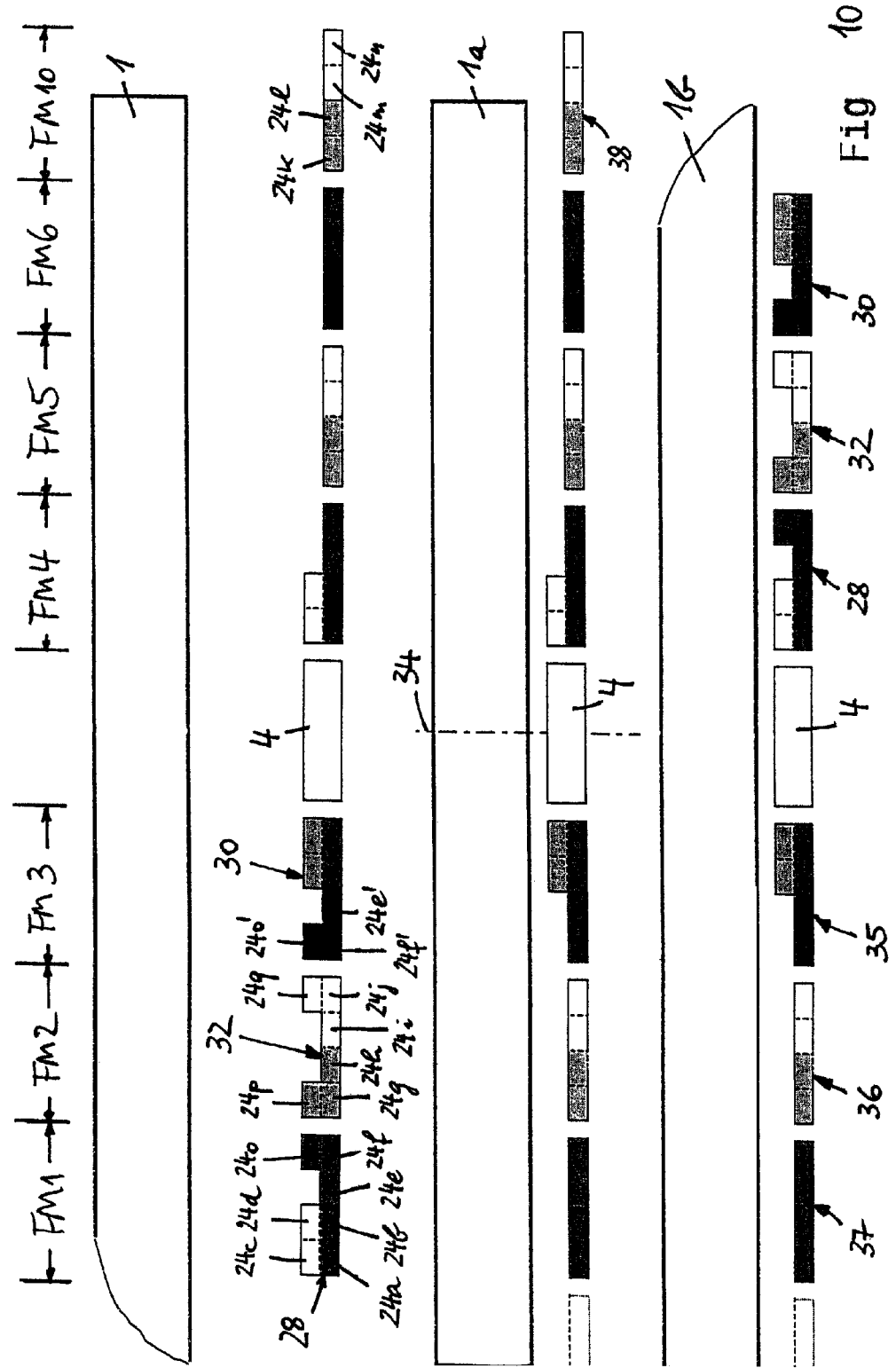

MAGLEV VEHICLE HAVING GUIDANCE MAGNETS

CROSS REFERENCE TO RELATED APPLICATIONS

This application is a United States National Phase application of International Application PCT/DE2007/001422 and claims the benefit of priority under 35 U.S.C. §119 of German Patent Application DE 10 2006 042 138.8 filed Sep. 5, 2006, the entire contents of which are incorporated herein by reference.

FIELD OF THE INVENTION

The present invention relates to a magnetic levitation vehicle (maglev vehicle) with a nose section with a plurality of guiding magnets arranged one behind the other in a direction of travel and a plurality of control circuits assigned to the guiding magnets, wherein the guiding magnets are at least partly provided with cores having two or more winding levels and with several windings arranged in the winding levels, lying one behind the other in the direction of travel and forming magnet poles.

BACKGROUND OF THE INVENTION

Maglev vehicles of this kind are known from prior art (e.g. DE 10 2004 056 438 A1). Guiding magnet systems of this type serve the purpose of keeping a magnetic levitation vehicle within the track gauge, particularly during curve rides and with lateral load interferences (e.g. due to wind), and for this purpose they are controlled by the aid of control circuits and gap sensors assigned to them in such a manner that a gap hereinafter designated as guiding gap between their magnet pole shanks and a lateral guiding rail is always maintained at a pre-selected value, e.g. 10 mm. With prior art guiding magnet systems, two groups of three guiding magnets each arranged in series and one braking magnet each located between these two groups are provided per vehicle or vehicle section in the longitudinal direction of the vehicle to serve this purpose. Each guiding magnet is formed by a magnet arrangement which has a core extending in the vehicle's longitudinal direction and two winding levels in which several windings each and gap sensors assigned to them are arranged behind each other. The windings and gap sensors in each guiding magnet are so connected in series in pairs each and so connected to the control circuits that a far-reaching redundancy is obtained. This means that the two windings lying one above each other at those ends of a guiding magnet which border a zone free from guiding magnets, i.e. which for example border a gap formed by a braking facility or the front or rear end of the vehicle are served by two different control circuits. At the same time, a redundant behavior at those ends of the guiding magnets that border another guiding magnet is achieved in that in case of a failure of the windings or control circuits located there the guiding function is taken over by the neighbored guiding magnet by feeding to the adjacent windings thereof a correspondingly higher current.

Guiding magnet systems composed of such guiding magnets are of a symmetrical setup throughout. On the one hand this means they are equally set-up regardless of whether they are installed into a nose section, a center section, or a rear section. On the other hand, the symmetry also consists in that the guiding magnets are mirror-symmetrically configured and arranged on both sides of a center level of the sections extending diagonally to the direction of travel, wherein a central area of each section in most cases is a zone free of guiding magnets and provided with a braking facility. The only deviation from an exact mirror-symmetry may consist in that transitional areas between two vehicle sections are also provided with guiding magnets and therefore the guiding magnets bordering them and arranged in the sections involved are provided with a number of windings which is less than the number that would be required on omission of the guiding magnets existing in the transitional areas.

The guiding magnet systems of magnetic levitation vehicles of the kind described are generally overdimensioned. Owing to the described symmetrical type of construction, the magnetic and/or guiding forces to be achieved are calculated based upon the heaviest loads occurring in operation. Though this bears the advantage that the entire magnetic levitation vehicle can be equipped with few different guiding magnet types, one has to put up with the fact that too high a reserve of magnetic force is available at some points along the vehicle and therefore more weight than necessary is installed due to the accordingly largely dimensioned iron cores. If this is to be avoided, loads may occur at certain points that are so high that the force of the guiding magnets is insufficient here, which would have an adverse influence on traveling comfort.

SUMMARY OF THE INVENTION

Now, therefore, the technical problem underlying the present invention is to equip the magnetic levitation vehicle of the species designated hereinabove with guiding magnets in such a manner that loads occurring during operation are taken into account in a better way than done hitherto on the one hand and that no superfluous weight needs to be installed any longer on the other hand.

According to the invention, a magnetic levitation vehicle is provided comprising a nose section. The nose section is comprised of a plurality of guiding magnets arranged one behind the other in a direction of travel and a plurality of control circuits assigned to the guiding magnets. The guiding magnets are at least partly provided with cores having two or more winding levels and with several windings arranged in the winding levels, lying one behind the other in the direction of travel and forming magnet poles. At least two windings each lying immediately next to each other or above each other are electrically connected in series with one of the control circuits assigned thereto. The guiding magnets in a front portion of the nose section area lying at the front in the direction of travel are at least partly provided with a larger number of windings than a more rearwardly portion in the nose section area lying more rearwardly in the direction of travel.

The magnetic levitation vehicle advantageously further comprises a tail section which is comprised of a plurality of guiding magnets arranged one behind the other in the direction of travel and a plurality of control circuits assigned to said guiding magnets. The guiding magnets are provided at least partly with cores having two or more winding levels and with several windings arranged in the winding levels, lying one behind the other in the direction of travel and forming magnet poles. At least two windings each lying immediately next to each other or above each other are electrically connected in series with one of the control circuits assigned thereto. The guiding magnets in a rear portion of the tail section in an area lying at the rear in the direction of travel are at least partly provided with a larger number of windings than in a more forward portion of the tail section in an area lying toward the front in the direction of travel.

By way of the present invention, it is for the first time ever that a guiding magnet system is created which on the one hand is "site-orientated", i.e. it has the required power reserves everywhere in longitudinal direction of the magnetic levitation vehicle, and on the other hand it can nevertheless be largely optimized with regard to weight, number of coils and/or windings as well as redundancy.

Other advantageous features of the present invention become evident from the text below. The invention is described and outlined in greater detail as set forth below by way of the attached drawings based on examples of embodiments. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

BRIEF DESCRIPTION OF THE DRAWINGS

In the drawings:

FIG. 3 is a schematic view showing the allocation of windings of the guiding magnets to control circuits with the nose section according to FIG. 1;

FIG. 4 is a schematic lateral view similar to FIG. 1, but relative to a transitional area between a nose section according to FIG. 1 and a middle section of the magnetic levitation vehicle;

FIG. 5 is a schematic view similar to FIG. 3, but relative to a transitional area between a nose section according to FIG. 1 and a middle section of the magnetic levitation vehicle;

FIG. 10 is a schematic lateral view showing a magnetic levitation vehicle comprised of one nose, middle, and tail section each and the guiding magnets used therein.

DESCRIPTION OF THE PREFERRED EMBODIMENTS

Figure 1:
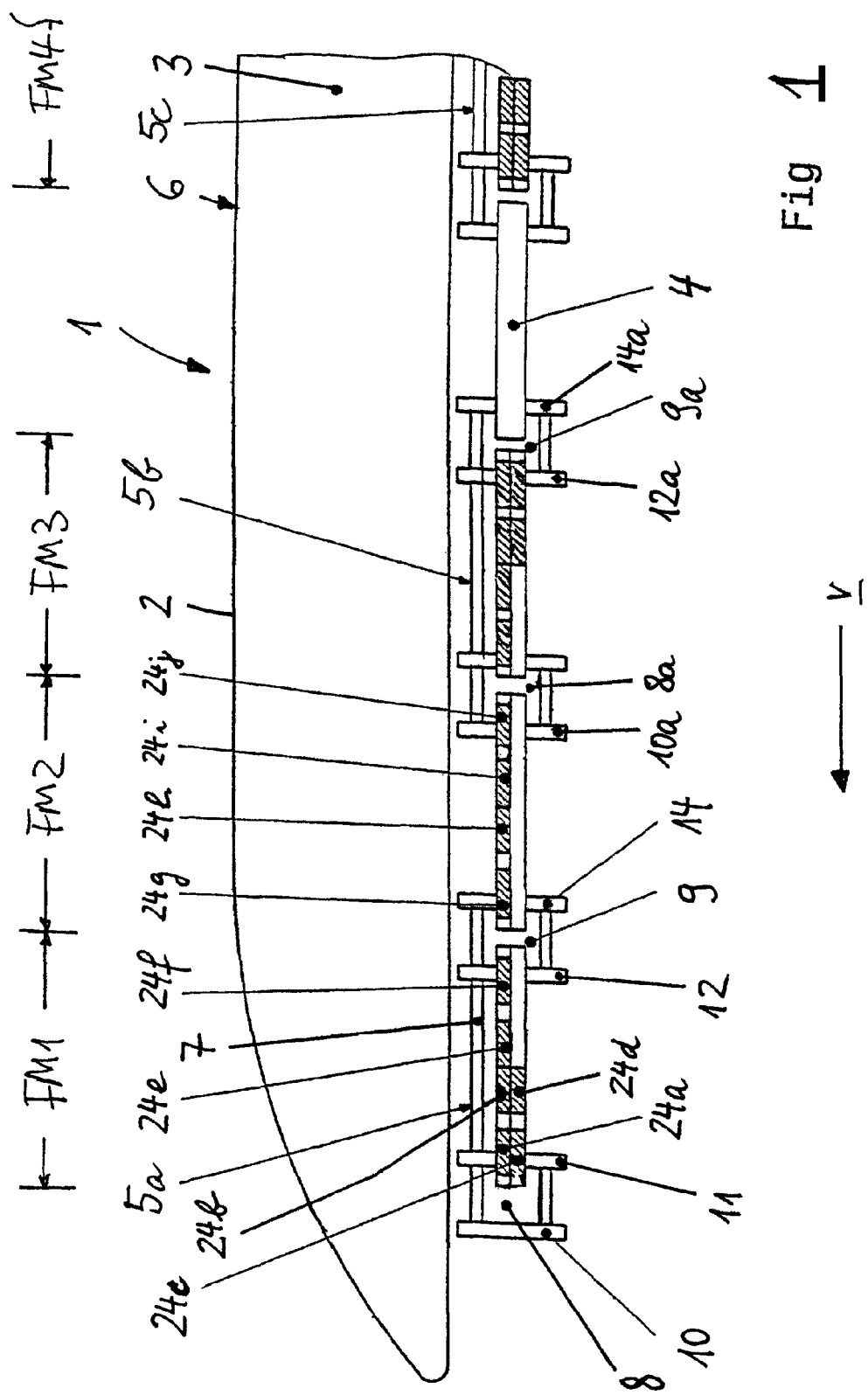
FIG. 1 is a schematic lateral view of a part of the nose section of a magnetic levitation vehicle.

Referring to the drawings in particular, FIG. 1 schematically shows a front zone of a nose section 1 of a magnetic levitation vehicle in a side view. The usual direction of travel of the nose section 1 is indicatively shown by arrow v. Moreover, reference number 2 designates a zone lying in the front viewed in the direction of travel v, while reference number 3 designates a zone of nose section 1 located downstream thereof in the direction of travel v. The two zones 2 and 3 are generally defined by the position of a braking facility 4 in form of an eddy-current brake or the like, which is arranged downstream of a pre-selected number of guiding magnets FM1, FM2 and FM3, i.e. three guiding magnets in this case, in the nose section 1.

Furthermore, FIG. 1 coarsely schematically shows some bogie sections 5a, 5b, and 5c of a bogie which in longitudinal direction of nose section 1 are arranged behind each other and engaged via not shown pneumatic springs to a wagon box 6 of nose section 1. The bogie sections 5a, 5 b, and 5c are comprised of support elements 8, 9 in form of frame parts spaced in longitudinal direction and connected through longitudinal beams 7 and provided with one front and one rear support part 10, 11, and/or 12, 14 each. Accordingly, in the embodiment example, the guiding magnet FM1 being the foremost in the direction of travel is so connected to the bogie section 5a that its front end is connected to the rear support part 11 of the front support element 8 and its rear end to the front support part 12 of the rear support element 9, as is clearly shown in FIG. 1. The next guiding magnet FM2 at its front end is pivoted to the rear support part 14 of the rear support element 9 of the bogie section 5a and at is rear end to the front support part 10a of a front support element 8a of the bogie section 5b following suit in the direction of travel. The third guiding magnet FM3 by analogy to the first guiding magnet FM1 is connected to the bogie section 5b. The described arrangement can be continued along the entire nose section 1. Preferably, however, downstream of the guiding magnet FM3 along a section which corresponds to the length of a guiding magnet, the braking facility 4 is built-in which forms a zone free of guiding magnets and which is pivoted to the upstream and downstream bogie section 5b and 5c each. Thus, a this point, the engagement of another guiding magnet to the rear support part 14a of the support element 9a is missing in the same manner as the front support part 10 of the front support element 8 in the nose area is not coupled to a guiding magnet, because a zone free of guiding magnets also lies upstream of the guiding magnet FM1—viewed in the direction of travel. As shown in FIG. 1, on the side lying on the right side, i.e. in the direction of travel v downstream of the braking facility 4, the arrangement is configured accordingly, commencing with a guiding magnet FM4. Moreover, it is obvious that only an area 2 of the nose section 1 lying at the front in the area of travel is shown in FIG. 1 and that there may be corresponding guiding magnets and, if any, further braking facilities 4 in the rear area 3 which is only partially visible in FIG. 1. In the example of the embodiment, however, the assumption is that three guiding magnets are also arranged in the direction of travel v downstream of the braking facility 4 which is followed by a middle section or a rear section which is engaged to the nose section 1 by way of a usual coupling.

Figure 2:
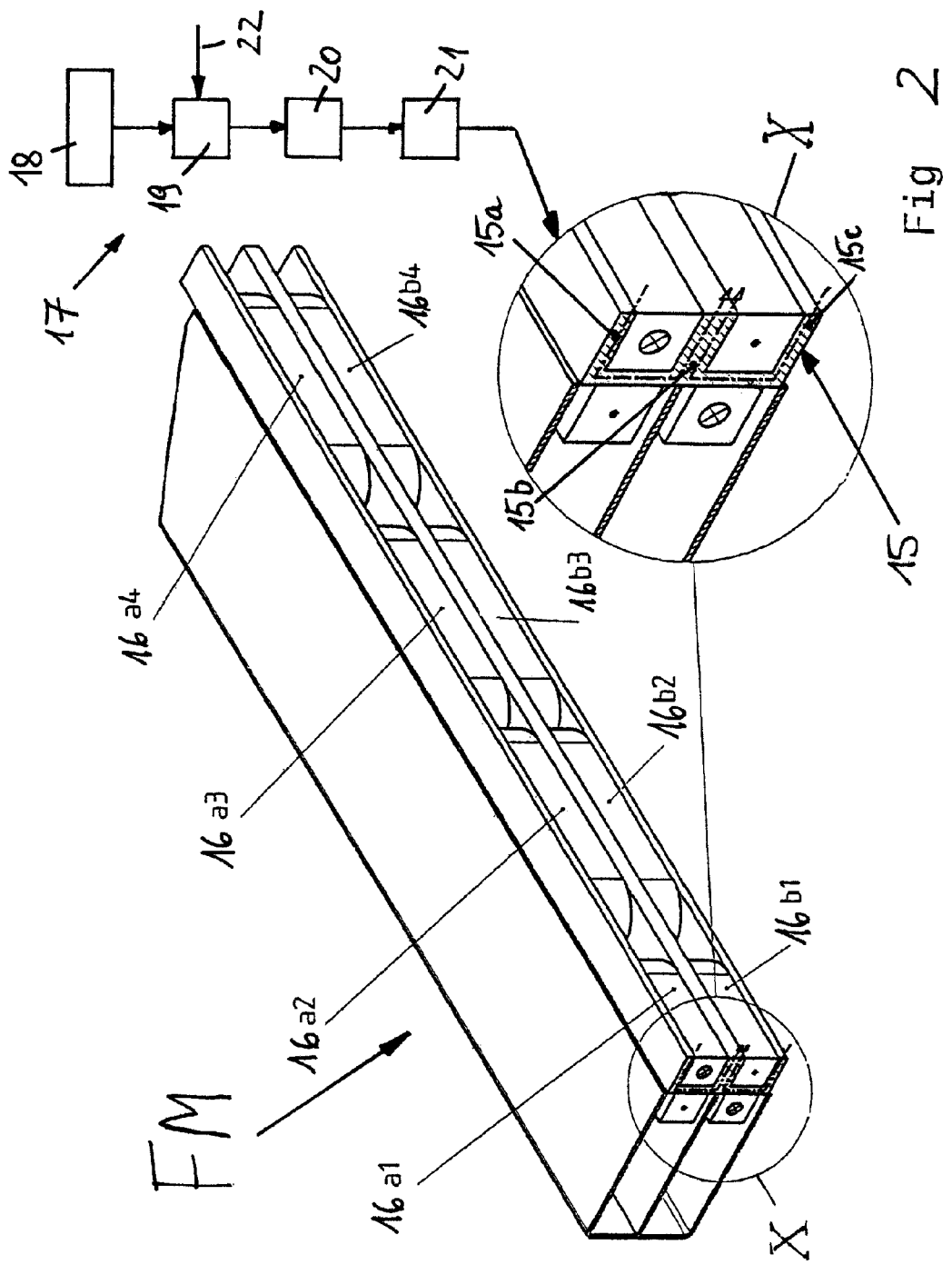
FIG. 2 is a schematic view showing the set-up of a guiding magnet system of the nose section according to FIG. 1.

In the spaces taken by the guiding magnets FM1 to FM3 as shown in FIG. 1—viewed in the direction of travel v—four magnet poles and/or magnet pole shanks each arranged one behind the other can be accommodated which are comprised of cores and assigned windings. FIG. 2 exemplarily shows it for a core 15 of a guiding magnet FM. Core 15 comprises three shanks 15a, 15b, and 15c whose free forefront areas lie in one plane and which together with a non-shown lateral guiding rail mounted at the guideway of the magnetic levitation vehicle form a guiding gap not shown either between it and the guiding magnet FM. The web parts of core 15 which connect the shanks 15a to 15c are wrapped in two winding levels arranged above each other with windings 16a1 to 16a4 and 16b1 to 16b4 lying behind each other in the direction of travel and/or in longitudinal direction so that the guiding magnet FM may maximally comprise eight windings 16. The windings 16 are controlled by control circuits 17 in such a manner that the magnitude of the guiding gap during the ride of the magnetic levitation vehicle mainly remains constant. For this purpose, the control circuit 17 schematically indicated in FIG. 2 for the winding 16b1 at least comprises one gap sensor 18, a comparator 19 connected to it, a control element 20 connected to it and an actuator 21, e.g. a current actuator, connected to the control element 20 and to the winding 16b1. The gap sensor 18 supplies a signal which corresponds to the actual value of the guide gap and which is compared in comparator 19 with the setpoint signal for the guide gap supplied through a line 22. From the difference between the actual values and setpoint values, the control element 20 computes an actuator signal supplied to the actuator 21. Finally, the actuator 21 controls the current through the winding 16b1 in such a manner that the part of the guide gap influenced by it steadily corresponds mainly to the setpoint value.

As shown in FIG. 1, it is not always required to accommodate the maximally eight possible magnet poles within the space provided for each guiding magnet and defining a preselected grid dimension. Instead, in the example of the embodiment, all guiding magnets FM1 to FM3 comprise less than eight magnet poles and/or windings, each of which being indicatively shown by hatched boxes, with each box intended to represent one magnet pole shank and the assigned winding. In its front half, the guiding magnet FM1, in particular, comprises windings 24a, 24b, 24c, and 24d spread on two levels, while in its rear half it only comprises two windings 24e and 24f, which are arranged in one level one behind the other. In a unique level which preferably corresponds to the level of the windings 24e and 24f, the guiding magnet FM2 comprises four windings 24g, 24h, 24i, and 24j arranged one behind the other. The guiding magnet FM3 is configured mirror-symmetrically to the guiding magnet FM1 and like this it is provided with six windings. The guiding magnets FM4 etc. following downstream of the braking facility are configured like the guiding magnets FM1 to FM3, though arranged mirror-symmetrically to these.

To economize on control circuits 17 (FIG. 2), the windings 24 each are combined in a series connection and connected to an assigned control circuit 17. This is schematically shown in FIG. 3 in which the windings 24a to 24j etc. shown in FIG. 1 are represented by single fields occupied with Roman figures. Fields with identical figures indicate that the relevant windings are switched in series and assigned to the same control circuit 17. For example, a comparison between FIG. 1 and FIG. 3 shows that the windings 24a and 24 are assigned to a control circuit I, while the windings 24b and 24c are assigned to a control circuit II, and the windings 24e, 24f are assigned to a control circuit III.

From the described arrangement, it follows that at those points where the guiding magnets border on the zones being free of guiding magnets, two pairs of windings each (e.g. 24a, 24b, and 24c, 24d) are arranged one behind the other, while only individual windings 24e to 24j etc. each exist there in between. The main reason for this arrangement is the required redundancy. In the middle areas of nose section 1, for example, a winding pair (e.g. 24e, 24f) located at the end of a guiding magnet can be supplied with an increased current through the assigned control circuit III, if one winding couple (e.g. 24g, 24h) of a neighboring guiding magnet or the control circuit (e.g. IV) assigned to it fails to work. The one guiding magnet can thereby at least partly compensate the failure of the defective guiding magnet. This possibility is not given where the guiding magnets FM1 or FM3 border on a zone being free of guiding magnets. Therefore the arrangement taken there is chosen in such a manner that it is inherently redundant. It means that in this case, for example, the windings 24b, 24c lying diagonally above each other are supplied with increased current from control circuit II, if the winding couple from the windings 24a and 24d also lying diagonally above each other or if the assigned control circuit I fails to work.

In the rear area of nose section I, appropriate guiding magnets FM4, FM5, and FM6 are provided for, as is schematically shown in FIG. 4. At the right end of nose section 1 shown in FIG. 1, in particular, there could be a guiding magnet FM6 corresponding to the guiding magnet FM3. This is expedient in particular in those cases in which the nose section 1 is to be utilized on its own, too. However, if it is constantly used with a coupled middle or tail section, then the arrangement according to FIGS. 4 and 5 lends itself suitable, in which the conditions at a rear end of nose section 1 viewed in the direction of travel v and at a front end of a middle section 1a coupled to it are shown, which comprise among others the guiding magnets FM7, FM8, and FM9.

In FIGS. 4 and 5, it has been taken into account that a transitional area 26 between the coupled sections 1 and 1a of a magnetic levitation vehicle like transitions to the already described zones being free of guiding magnets entail undesired load changes. Therefore, the exemplary embodiment according to FIGS. 4 and 5 provides for configuring the last guiding magnet FM6 at the rear end of the nose section 1 and the first guiding magnet FM7 at the beginning of the middle section 1a each not like the guiding magnet FM4 and/or FM1 but like the guiding magnets FM2. Moreover, in the transitional area 26 between the guiding magnets FM6 and FM7, another guiding magnet FM10 is arranged which is also configured like the guiding magnet FM2 and which comprises four windings 24k, 24l, 24m, and 24n which expediently lie in the same plane as the windings of the guiding magnets FM6 and FM7. The allocations of control circuits IX to XIV result from FIG. 6, according to which two windings each lying one behind the other in the direction of travel v (e.g. 24k, 24l, or 24m, 24n) are connected in series circuitry with an assigned control circuit (e.g. XI and XII).

A corresponding arrangement can be provided in all transitional areas between the nose, tail and middle sections existing in an individual case.

An advantage of the configuration of guiding magnets FM6, FM7, and FM10 that becomes evident from FIGS. 4 and 5 lies in that a band of windings and/or magnetic poles is obtained through them, i.e. a continuous magnetic flow band, which runs through uninterruptedly between two zones being free of guiding magnets, e.g. in form of braking facilities 4 and 4a in FIG. 4. In this band, the windings lie individually one behind the other with the consequence that a continuous rupture and rebuilding of the magnetic flow is avoided and that load changes as well as moments to be observed can occur only where zones being free of guiding magnets are unavoidable in the way as valid for the beginning or the end of a magnetic levitation vehicle or for the braking facilities 4, 4a. It is obvious that the arrangement described in FIGS. 1 to 5 for the nose section 1 and a middle section 1a may also be provided for in a tail section, more particularly if the magnetic levitation vehicle is configured symmetrically towards the vehicle center and for movement in two opposite directions, i.e. comprised of nose and tail sections of an identical setup though arranged mirror-symmetrically to a center plane.

Guiding magnet systems of this kind are known in particular from the document DE 10 2004 056 438 A which is hereby made by reference an object of the present disclosure to avoid repetition (corresponding US application publication US2008257197 is also incorporated herein by reference).

The guiding magnet systems described therein have not proved to be absolutely ideal. In particular it became evident that different loads occur at individual pivot points of the bogie formed by support parts 14, 10a, 14a, etc. For example, the first guiding magnet FM1 in the direction of travel v must not only pull the nose section 1 more strongly into the curves provided along the guideway, but in general it also has to compensate for stronger wind loads and/or incline drift-down forces than those valid for guiding magnet systems in middle areas of nose section 1 and for middle and tail sections coupled to them. According to the present invention it is therefore proposed to provide the guiding magnets in an area of nose section 1 lying at the front in the direction of travel v with a larger number of windings than in an area lying at the rear in the direction of travel. For this purpose, another three embodiments for the magnet arrangements of the guiding magnets are provided according to FIGS. 6 to 8. A fourth embodiment according to FIG. 9 may alternatively be applied to the variants as per FIGS. 6 and 7.

In FIGS. 6 to 9, those windings which already exist in the magnet arrangements as per FIG. 1 are designated with the same reference numbers. A difference versus FIG. 1 consists in that for example in FIG. 6 the windings 24a, 24b, 24e, and 24f are represented in the lower rather than in the upper winding level and vice-versa the windings 24c, 24d are represented in the upper rather than in the lower winding level. But this does not imply a difference in principle, because the desired function of the guiding magnets can be obtained regardless of whether the mentioned windings are arranged in the upper or in the lower winding level.

Figure 6:
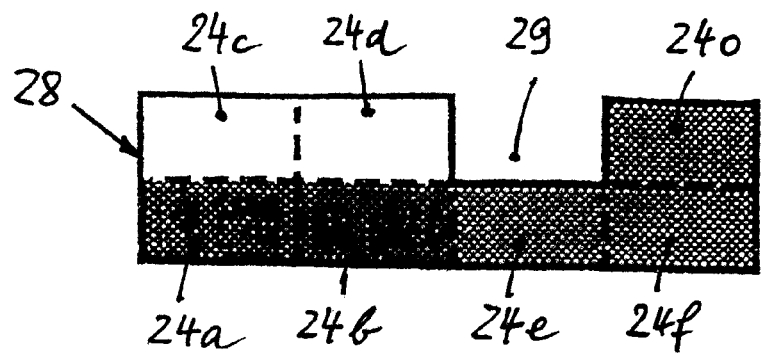
FIG. 6 is a schematic view showing one of various examples of embodiments of guiding magnets applied in an inventive magnetic levitation vehicle.

FIG. 6 schematically shows a magnet arrangement 28 for a guiding magnet which like in FIG. 1 comprises the four windings 24a, 2b, 24e, and 24f in a first winding level and the two windings 24c, 24d in a second winding level, while an additional winding 24o is accommodated in the second winding level at the end of magnet arrangement 28 which is provided with winding 24f. A gap 29 having the size of one winding remains between this winding 24o and the winding 24d existing in the same winding level, so that this guiding magnet on the whole comprises an odd number of seven magnet pole shanks and/or windings. The different hatching in FIG. 6 indicate that on the one hand the front (left) winding couples comprised of windings 24a, 24b, and 24c, 24d lying side by side are connected in series circuitry with one of the first and/or second assigned control circuit each, while on the other hand in the rear (right) area, the three windings 24e, 4f and 24o are connected in series circuitry to a third control circuit (e.g. to control circuit III in FIG. 3). Alternatively, however, it is also possible to allocate the winding couples from the windings 24a, 24d and 24b, 24c lying diagonally above each other by analogy to FIGS. 1 and 3 to control circuit I and/or II (FIG. 3) each.

Figure 7:
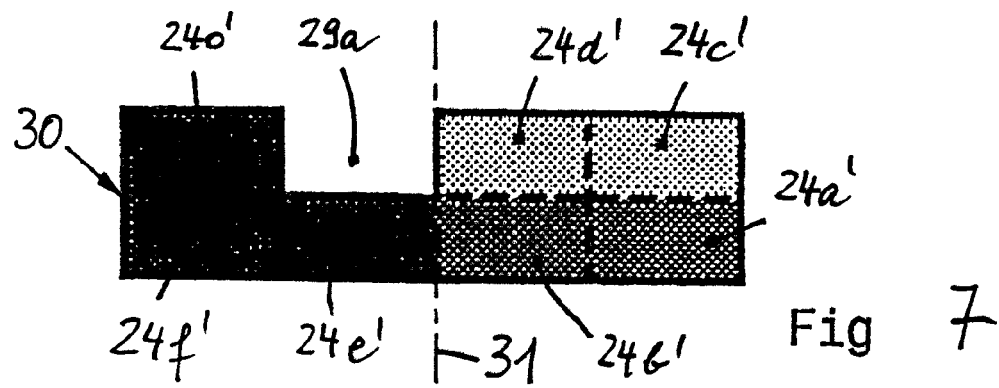
FIG. 7 is a schematic view showing one of various examples of embodiments of guiding magnets applied in an inventive magnetic levitation vehicle.

FIG. 7 shows another magnet arrangement 30 for a guiding magnet. In a first winding level, this magnet arrangement 30 is comprised of four windings 24a', 24b', 24e', 24f' arranged one behind the other and in a second winding level it is comprised of two windings 24c' and 24d' in the rear (right) part on the one hand and of an additional winding 24o at the front end. Therefore, this magnet arrangement 30 exactly corresponds to the magnet arrangement 28, with the exception that it is turned by 180° about an axis 31 indicated in FIG. 7. A gap 29a, therefore, comes to rest at a point which in comparison to FIG. 6 is staggered by one winding. Moreover, like in case of FIG. 6, the windings 24a', 24b', and 24c', 24d' can for example be assigned to one control circuit each and the three windings 24e', 24f' and 24o' can be connected to a third control circuit. Besides, FIG. 7 shows that the magnet arrangement 30 like the magnet arrangement 28 (FIG. 6) is comprised of seven windings and except for the winding 24o' it corresponds to that of guiding magnet FM3 in FIG. 1.

Figure 8:
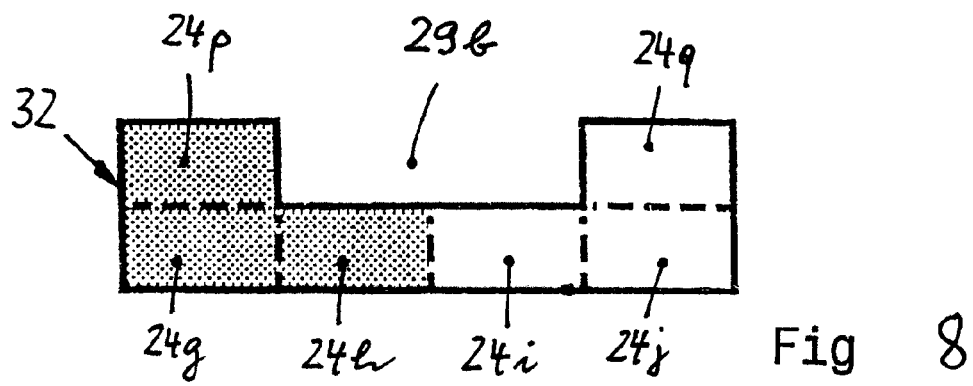
FIG. 8 is a schematic view showing one of various examples of embodiments of guiding magnets applied in an inventive magnetic levitation vehicle.

FIG. 8 shows another magnet arrangement 32 which in a first winding level comprises the four windings 24g to 24j arranged one behind the other like in guiding magnet FM2 in FIG. 1, but which at both ends additionally comprises a further winding 24p and 24q each arranged in a second winding level. Accordingly, three windings (e.g. 24g, 24h, and 24p and/or 24i, 24j, and 24q each lying immediately above each other and next to each other are connected in a series circuitry to one control circuit each, as indicated by the two different hatchings in FIG. 8. The magnet arrangement 32, therefore, comprises six windings distributed to two winding levels, wherein the two windings 24p and 24q are separated by a gap 29b which corresponds to the length of two windings.

By way of the additional magnet arrangements 28, 30, and 32, in combination with the three magnet arrangements which form the guiding magnets FM1, FM2, and FM3 in FIG. 1, six different magnet arrangements in total are obtained which form a modular box from which not only all the guiding magnets to be configured along a magnetic levitation vehicle but also the different loads can be considered that may occur at different sites of a magnetic levitation vehicle.

Figure 9:
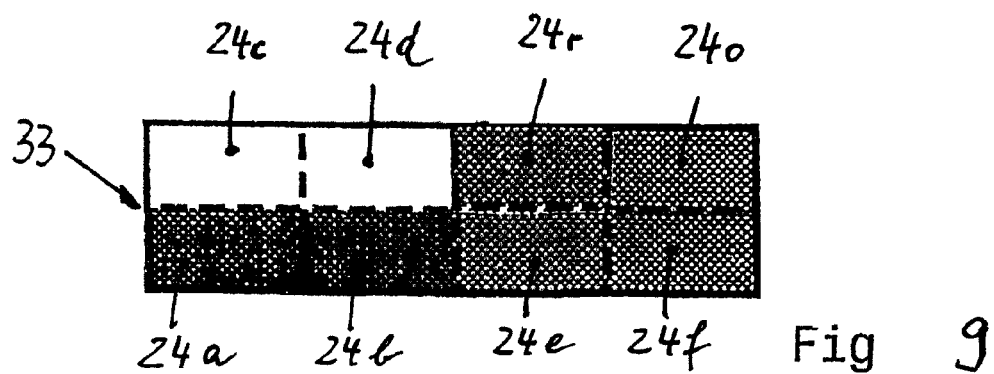
FIG. 9 is a schematic view showing one of various examples of embodiments of guiding magnets applied in an inventive magnetic levitation vehicle.

Another magnet arrangement 33 that can be utilized for the same purpose is shown in FIG. 9. In two winding levels, it comprises four windings each which are allocated according to the different hatchings in FIG. 9 to three different control circuits. The magnet arrangement 33, for example, originates from the magnet arrangement 28 according to FIG. 6 by filling its gap 29 with another winding 24r so that all the eight possible windings exist here.

A possible equipment of a magnetic levitation vehicle by applying the windings described by way of FIGS. 1 and 6 to 8 is shown in FIG. 10 by an exemplary embodiment currently considered to be the best. In FIG. 10, the three sections, i.e. the nose section 1, the middle section 1a and a tail section 1b configured mirror-symmetrically to the nose section 1 are indicatively shown with their outer peripheral contours only and for space related consideration they are shown in an arrangement one below the other, although in fact they are of course coupled one behind the other in conformity with FIG. 4 in the direction of travel v. Moreover, the guiding magnets accommodated in the individual sections 1, 1a, and 1b each are schematically shown underneath the relevant peripheral contour similarly as in FIGS. 1, 4 and 6 to 8.

By analogy to FIG. 1, each section 1, 1a, and 1b in a middle area comprises a braking facility 4 and upstream and/or downstream thereof viewed in the direction of travel v it contains three guiding magnets each. In a foremost area of the nose section 1, the guiding magnet FM1 is formed by a magnet arrangement 28 according to FIG. 5. It is followed by the guiding magnet FM2 with a magnet arrangement 32 according to FIG. 8, and arranged between the magnet arrangement 32 and the braking facility 4 is a magnet arrangement 30 according to FIG. 7 of the guiding magnet FM3. According to the present invention, the three magnet arrangements 28, 30, and 32 supersede the three magnet arrangements of guiding magnets FM1 to FM3 shown in FIG. 1.

In the area located downstream of the braking facility 4—viewed in the direction of travel v, the three guiding magnets FM4, FM5, and FM6 of the nose section 1 are configured exactly as shown in FIG. 4, in addition there also being the windings 24k to 24n of the guiding magnet FM10 in the transitional area between nose section 1 and middle section 1a. Besides, FIG. 10 shows that except for the points bordering on the braking facility 4 there are only magnet arrangements in the middle section 1a which correspond to the guiding magnets FM5 to FM8 in FIG. 4, whereas in those areas bordering on the braking facilities 4, there are guiding magnets provided which correspond to the guiding magnets FM9 and/or FM4 in FIG. 4.

Finally, it becomes evident from FIG. 10 that the tail section 1b is configured mirror-symmetrically to a central level 34 of the magnetic levitation vehicle which is perpendicular to the direction of travel v. Therefore, the tail section 1b has a magnet arrangement 30 as per FIG. 7 at the rear right-hand end shown in FIG. 10, and a magnet arrangement 28 as per FIG. 6 in an area bordering from the right-hand side on the braking facility 4, and a magnet arrangement 32 as per FIG. 8 between both of them. The rear area—viewed in the direction of travel—of the tail section 1b, therefore, is configured mirror-symmetrically, but besides exactly as the front-end area of the nose section 1. Accordingly this applies to the front-end area of the tail section 1b, which is configured mirror-symmetrically to the rear area of the nose section 1, because magnet arrangements 35, 36, and 37 are provided here which correspond to the magnet arrangements of the guiding magnets FM4 to FM6, with the magnet arrangement 35 being configured mirror-symmetrically to that of guiding magnet FM4. Moreover, in between of both sections 1a and 1b, there is a magnet arrangement 38 which corresponds to the magnet arrangement of guiding magnet FM10 existing between both sections 1 and 1a.

The configuration of guiding magnets in various sections as described by way of FIG. 10 bears the advantage that the sections are provided with the strongest magnet arrangements at those points where the highest loads occur, and therefore, they can be subjected to high guiding forces. In particular, in the nose and tail section 1, 1b in an area where the magnet arrangements 28, 32 face each other and/or border on each other, two winding couples and/or magnet pole couples (e.g. 24f, 24o an 24g, 24p) instead of hitherto only two single windings and/or magnet pole shanks (e.g. 24f and 24g) face each other as becomes evident by comparing FIG. 1 and FIG. 10. By the aid of windings 24o, 24p, 24q, and 24o' which are additionally provided as compared with FIG. 1, substantially higher loads than in the other areas can be compensated which is particularly important in the pivoting points of the bogie. On the other hand, the arrangement has nevertheless been so chosen that in case of a failure of windings 24e, 24f, 24o or 24e', 24f, 24o', for example, or in case of a failure of the assigned control circuits, the windings 24g, 24h, 24p and/or 24i, 24j, 24q can compensate this failure with an appropriate increase in current. In the rear area of nose section 1 and in the following sections 1a, 1b, such an increase in magnetic force generally is not required, which is the reason why the hitherto chosen arrangement (FIG. 1 and FIG. 4) are is maintained. Conversely, the tail section 1b is expediently configured mirror-symmetrically to nose section 1 whenever it is to form a nose section in reversed direction of travel. Unless required, the tail section 1b could also be configured mirror-symmetrically to the nose section as per FIG. 1 as done hitherto.

Besides, a comparison of FIGS. 1 and 10 shows that the front part of the nose section 1 according to FIG. 10 comprises twenty windings in total as compared with sixteen windings in FIG. 1, which corresponds to an increase in magnetic force by 25%.

For magnetic levitation vehicles which are exposed to extreme loads in the nose and tail section, the magnet arrangements 28 and/or 30 (FIGS. 6 and 7) provided in FIG. 10 can also be superseded by the magnet arrangement 33 (FIG. 9). Thereby another winding 24r would be available to generate an increased guiding force.

Apart from the advantage of making it possible to generate guiding forces along the magnetic levitation vehicle depending on the site and load, the invention moreover bears another advantage in that as compared with the conventional arrangement as per FIGS. 1 and 4 it is not required to create additional space for magnet poles and/or magnet pole shanks and that no additional control circuits are needed. Furthermore, viewed across the entire length of the magnetic levitation vehicle—it is possible to provide the smallest number of magnet poles (cores and windings) each that is feasible depending on the load occurring in a given case, thus also taking a positive influence on the overall weight of the magnetic levitation vehicle. And as shown in FIGS. 1 and 4, it is possible to configure a continuous magnet flow band between the zones being free of guiding magnets and thus to keep the number of load changes along the magnetic levitation vehicle small.

The present invention is not restricted to the described example of the embodiments which could be varied in a plurality of ways. In particular this applies to the described form of cores and windings of the magnet arrangements and to the configuration of the guiding magnets in all other respects. Moreover, further and/or differently configured magnet arrangements can be provided in addition to the described magnet arrangements, provided they do not substantially affect the described functions of the guiding magnet system. For this purpose, it is in principle sufficient for each magnet arrangement to be provided only with the windings described. The length of magnet arrangements measured in the longitudinal direction of the vehicle and the configuration of the magnet poles expediently are equal everywhere according to a defined grid length. Furthermore, the invention is not restricted to the described numbers of guiding magnets, i.e. upstream and downstream of the braking facilities 4, 4a, it is possible to provide only two or more than two guiding magnets. Moreover, there may be more than two braking facilities 4 per section, in between of which further guiding magnets are arranged. The number of control circuits, too, can be chosen to be different, with it being possible to assign one control circuit of its own to each individual winding. Though it would increase the cost, the setting-up of the redundancy would be simplified. Furthermore, it is clear and obvious that the guiding magnets can be equipped in an actually known manner with gap sensors which are arranged in the gaps between various windings as shown in FIGS. 1 and 4, for example. Besides, it is self-evident that the various features can be applied in combinations other than those described and illustrated.

While specific embodiments of the invention have been shown and described in detail to illustrate the application of the principles of the invention, it will be understood that the invention may be embodied otherwise without departing from such principles.

The invention claimed is:

1. A magnetic levitation vehicle comprising:
   a nose section and at least one further section coupled to said nose section, said nose section comprising:
   a plurality of guiding magnets arranged one behind the other in a direction of travel; and
   a plurality of control circuits assigned to said guiding magnets, wherein the guiding magnets are at least partly provided with cores having two or more winding levels and with several windings arranged in the winding levels, lying one behind the other in the direction of travel and forming magnet poles, wherein at least two windings each lying immediately next to each other or above each other are electrically connected in series with one of the control circuits assigned thereto, said nose section being provided with a zone free of guiding magnets in a middle area, the guiding magnets in a front portion of the nose section lying at the front in the direction of travel and with respect to the middle area being at least partly provided with a larger number of windings than the guiding magnets in a rearward portion of the nose section lying more rearwardly in the direction of travel and with respect to the middle area such that at least one magnet in said front portion comprises more windings than any magnet in the rearward portion, wherein a further guiding magnet is provided at a transitional area between said nose section and the at least one further section coupled to said nose section, wherein the windings of the guiding magnet in the transitional area are arranged under said nose section and the further section partially attributed to said nose section and the further section respectively, wherein a total number of windings of said nose section lying upstream of said zone free of guiding magnets in the direction of travel is greater than a total number of windings of the nose section lying downstream of said zone free of guiding magnets including all of the windings in the transitional area located under the nose section.

2. A magnetic levitation vehicle, as defined in claim 1, further comprising:
a tail section which is comprised of:
a plurality of guiding magnets arranged one behind the other in the direction of travel; and
a plurality of control circuits assigned to said guiding magnets, wherein the guiding magnets are provided at least partly with cores having two or more winding levels and with several windings arranged in the winding levels, lying one behind the other in the direction of travel and forming magnet poles, wherein at least two windings each lying immediately next to each other or above each other are electrically connected in series with one of the control circuits assigned thereto, and wherein the guiding magnets in a rear portion of the tail section in an area lying at the rear in the direction of travel are at least partly provided with a larger number of windings than in a more forward portion of the tail section in an area lying toward the front in the direction of travel.

3. A magnetic levitation vehicle as defined in claim 2, wherein the guiding magnets of the tail section are configured and arranged mirror-symmetrically to the guiding magnets of the nose section.

4. A magnetic levitation vehicle as defined in claim 1, wherein a braking facility is arranged in the zone being free of guiding magnets.

5. A magnetic levitation vehicle as defined in claim 1, wherein the nose and/or tail section in the direction of travel upstream and/or downstream of the zone being free of guiding magnets is comprised of three equally long guiding magnets each.

6. A magnetic levitation vehicle as defined in claim 5, wherein two guiding magnets facing the front end of the nose section and/or the rear end of the tail section and the zone being free of guiding magnets are comprised of seven windings each and that a guiding magnet arranged in between said two guiding magnets is comprised of six windings.

7. A magnetic levitation vehicle as defined in claim 6, wherein a guiding magnet facing the front end of nose section and/or the rear end of tail section is comprised of a larger number of windings than the two guiding magnets.

8. A magnetic levitation vehicle as defined in claim 7, wherein the guiding magnet facing the front end of nose section and/or the rear end of tail section is comprised of eight windings, and that the other two guiding magnets conversely are comprised of six and/or seven windings.

9. A magnetic levitation vehicle as defined in claim 1, wherein guiding magnets facing the front end of nose section and/or the rear end of tail section and/or the zone being free of guiding magnets are comprised of at least four windings arranged in two winding levels at their front and/or rear end and/or at their end facing the zone being free of guiding magnets, wherein two windings each arranged one behind the other or one behind the other and diagonally one above the other in the direction of travel are electrically switched in series and connected to one of the control circuits assigned to them.

10. A magnetic levitation vehicle as defined in claim 1, wherein said nose section comprises a first upstream magnet arrangement, a second upstream magnet arrangement and a third upstream magnet arrangement located upstream of said zone free of guiding magnets, said second upstream magnet arrangement being located between said first upstream magnet arrangement and said third upstream magnet arrangement, said first upstream magnet arrangement being associated with a first number of first upstream windings, said second upstream magnet arrangement being associated with a second number of second upstream windings, said third upstream magnet arrangement being associated with a third number of third upstream windings, said first number of first upstream windings being equal to said third number of third of third upstream windings, said second number of second upstream windings being different from said first number of first upstream windings and said third number of third upstream windings.

11. A magnetic levitation vehicle as defined in claim 10, wherein said first upstream magnet arrangement is associated with a plurality of first top windings and a plurality of first bottom windings, said plurality of first top windings being arranged at a position above one or more of said plurality of first bottom windings, one of said first top windings being arranged at a spaced location from another one of said first top windings.

12. A magnetic levitation vehicle as defined in claim 11, wherein said second upstream magnet arrangement is associated with a plurality of second top windings and a plurality of second bottom windings, said plurality of second top windings being arranged at a position above one or more of said plurality of second bottom windings, one of said second top windings being arranged at a spaced location from another one of said second top windings.

13. A magnetic levitation vehicle as defined in claim 12, wherein said third upstream magnet arrangement is associated with a plurality of third top windings and a plurality of third bottom windings, said plurality of third top windings being arranged at a position above one or more of said plurality of third bottom windings, one of said third top windings being arranged at a spaced location from another one of said third top windings.

14. A magnetic levitation vehicle as defined in claim 10, wherein said nose section comprises at least a first downstream magnet arrangement and a second downstream magnet arrangement, said first downstream magnet arrangement being located adjacent to said zone free of guide magnets, said first downstream magnet arrangement being associated with a first number of first downstream windings, said second downstream magnet arrangement being associated with a second number of second downstream windings, said first number of first downstream windings being different from said second number of second downstream windings.

15. A magnetic levitation vehicle comprising:
a nose section;
a further magnetic levitation vehicle section connected to said nose section, said further magnetic levitation vehicle section being downstream of said nose section in a direction of travel, said further magnetic levitation vehicle section and said nose section defining a transitional area, said transitional area comprising an arrangement of transitional area magnets, said arrangement of transitional area magnets extending from said nose section to said further magnetic levitation vehicle section, said transitional area magnets including a plurality of transitional area windings, one of said transitional area windings being arranged at least partially under said nose section, another one of said transitional area windings being arranged at least partially under said further magnetic levitation vehicle section, said nose section comprising a front portion comprising a first plurality of guiding magnets, a middle area comprising a zone free of guiding magnets, a rear portion comprising a second plurality of guiding magnets and a plurality of control circuits for said first plurality of guiding magnets and said second plurality of guiding magnets, said rear portion being located at a position downstream of said zone free of guiding magnets in the direction of travel, said front portion being located upstream of said zone free of guiding magnets in the direction of travel, each of said first plurality of guiding magnets being arranged behind another one of said first plurality of guide magnets in the direction of travel, each of said second plurality of guiding magnets being arranged behind another one of said second plurality of guide magnets in the direction of travel, said first plurality of guiding magnets and said second plurality of guiding magnets comprising cores having two or more winding levels, wherein one or more windings are arranged in said winding levels, one winding of said windings being arranged adjacent to another one of said windings in the direction of travel, each of said windings forming a magnet pole, wherein at least two of said windings are arranged adjacent one another and said at least two of said windings are electrically connected in series with one of said control circuits assigned thereto, wherein a number of windings of said first plurality of guiding magnets is greater than a total number of windings of said second plurality of guiding magnets including all of the transitional area windings located under said nose section, wherein at least one magnet in said front portion includes more windings than any magnet in said rear portion.

16. A magnetic levitation vehicle as defined in claim 15, wherein said windings associated with said first plurality of guiding magnets are connected to said front portion of said nose section, said windings associated with said second plurality of guiding magnets being connected to said rear portion of said nose portion, said windings associated with said second plurality of guiding magnets being downstream of said zone free of guide magnets, said first plurality of guiding magnets comprising a first upstream magnet arrangement, a second upstream magnet arrangement and a third upstream magnet arrangement located upstream of said zone free of guiding magnets in the direction of travel, said second upstream magnet arrangement being located between said first upstream magnet arrangement and said third upstream magnet arrangement, said first upstream magnet arrangement being associated with a first number of first upstream windings, said second upstream magnet arrangement being associated with a second number of second upstream windings, said third upstream magnet arrangement being associated with a third number of third upstream windings, said first number of first upstream windings being equal to said third number of third upstream windings, said second number of second upstream windings being different from said first number of first upstream windings and said third number of third upstream windings.

17. A magnetic levitation vehicle as defined in claim 15, wherein said second plurality of guiding magnets comprises at least a first downstream magnet arrangement and a second downstream magnet arrangement located downstream of said first plurality of guiding magnets in the direction of travel, said first downstream magnet arrangement being located adjacent to said zone free of guide magnets, said first downstream magnet arrangement being associated with a first number of first downstream windings, said second downstream magnet arrangement being associated with a second number of second downstream windings, said first number of first downstream windings being different from said second number of second downstream windings.

18. A magnetic levitation vehicle comprising:
a nose section;
another magnetic levitation vehicle section connected to said nose section, said another magnetic levitation vehicle section and said nose section defining a transitional area, said transitional area comprising a plurality of transitional area magnets, said plurality of transitional area magnets including transitional windings, at least one of said transitional windings being arranged under at least a portion of said nose section, at least another one of said transitional windings being arranged under at least a portion of said another magnetic levitation section, said nose section comprising a front portion comprising a first upstream magnet arrangement and a second upstream magnet arrangement, a middle area, a rear portion comprising a first downstream magnet arrangement and a second downstream magnet arrangement, a zone free of guiding magnets in said middle area and a plurality of control circuits for said first upstream magnet arrangement, said second upstream magnet arrangement, said first downstream magnet arrangement and said second downstream magnet arrangement, said first upstream magnet arrangement and said second upstream magnet arrangement being located upstream of said zone free of guiding magnets in a direction of travel, said first downstream magnet arrangement and said second downstream magnet arrangement being located downstream of said zone free of said guiding magnets in the direction of travel, said first upstream magnet arrangement and said second upstream magnet arrangement being associated with a plurality of upstream magnet windings, said plurality of upstream magnet windings being arranged adjacent to said front portion of said nose section, said first downstream magnet arrangement and said second downstream magnet arrangement being associated with a plurality of downstream magnet windings, said downstream magnet windings being located adjacent to said rear portion, wherein a total number of said plurality of upstream magnet windings is greater than a total number of said plurality of downstream magnet windings including all of the transitional area windings located under the nose section.

19. A magnetic levitation vehicle as defined in claim 18, wherein said first upstream magnet arrangement is located adjacent to one side of said zone free of guiding magnets, said first upstream magnet arrangement being associated with a plurality of first upstream windings, said second upstream magnet arrangement being associated with a plurality of second upstream windings, wherein a number of said plurality of first upstream windings is equal to or greater than a number of said plurality of second upstream windings, said first downstream magnet arrangement being arranged adjacent to another side of said zone free of guiding magnets, said first downstream magnet arrangement being associated with a plurality of first downstream windings, said second downstream magnet arrangement being associated with a plurality of second downstream windings, wherein a number of said plurality of first downstream windings is greater than a number of said plurality of second downstream windings, wherein at least one magnet in said front portion comprises more windings than any magnet in said rear portion.

20. A magnetic levitation vehicle as defined in claim 15, wherein said further magnetic levitation vehicle section is arranged between said nose section and a magnetic levitation vehicle end section.

* * * * *